(12) United States Patent
Rhodes et al.

(10) Patent No.: US 8,585,058 B2
(45) Date of Patent: Nov. 19, 2013

(54) LEAF SEAL AND METHOD OF PRODUCING A LEAF SEAL

(75) Inventors: Nigel Anthony Rhodes, NewBold Verdon (GB); Ernst Vogt, Remigen (CH)

(73) Assignee: ALSTOM Technology Ltd., Baden (CH)

( * ) Notice: Subject to any disclaimer, the term of this patent is extended or adjusted under 35 U.S.C. 154(b) by 1154 days.

(21) Appl. No.: 11/538,104

(22) Filed: Oct. 3, 2006

(65) Prior Publication Data

US 2007/0085277 A1    Apr. 19, 2007

Related U.S. Application Data

(63) Continuation of application No. PCT/EP2005/051611, filed on Apr. 13, 2005.

(30) Foreign Application Priority Data

Apr. 23, 2004   (DE) .......................... 10 2004 020 378

(51) Int. Cl.
   *F01D 11/02*   (2006.01)
(52) U.S. Cl.
   USPC ........................................................ 277/355
(58) Field of Classification Search
   USPC ............... 277/355, 411, 421; 415/174.2, 174, 415/230, 231
   See application file for complete search history.

(56) References Cited

U.S. PATENT DOCUMENTS

| 6,120,622 | A | 9/2000 | Mayr et al. |
|---|---|---|---|
| 6,267,381 | B1 | 7/2001 | Wright |
| 6,343,792 | B1 | 2/2002 | Shinohara et al. |
| 6,553,639 | B2 | 4/2003 | Hobbs et al. |
| 6,860,484 | B2 | 3/2005 | Urlichs |
| 6,874,788 | B2 * | 4/2005 | Kono ............................ 277/355 |

(Continued)

FOREIGN PATENT DOCUMENTS

| DE | 19641375 | 12/1997 |
|---|---|---|
| DE | 19745184 | 4/1999 |

(Continued)

OTHER PUBLICATIONS

Search Report for German Patent App. No. 10 2004 020 378.4 (Feb. 28, 2005).

(Continued)

*Primary Examiner* — Gilbert Lee
(74) *Attorney, Agent, or Firm* — Cermak Nakajima LLP; Adam J. Cermak

(57) ABSTRACT

A leaf seal for sealing a shaft rotating about an axis, in particular in a gas turbine, includes a multiplicity of spaced-apart leaves (26) which are arranged in a concentric circle around the axis and are fixed in their position by welded connections produced by electron beam welding, the leaves (26), with their surfaces, being oriented essentially parallel to the axis. The welded connections of the leaves are improved by the leaves (26) being designed in such a way and being arranged in the leaf seal in such a way that they abut against one another at the side edges directly or via intermediate spacers (27) along at least one contact line (36) extending over a plurality of leaves (26), and by the welded connections being designed as welds directed along the at least one contact line (36) and oriented in axial direction.

6 Claims, 5 Drawing Sheets

(56) References Cited

U.S. PATENT DOCUMENTS

| | | | |
|---|---|---|---|
| 6,935,631 B2 | 8/2005 | Inoue | |
| 7,047,638 B2 | 5/2006 | Eldridge et al. | |
| 7,201,378 B2 * | 4/2007 | Kono | 277/355 |
| 2004/0232621 A1 * | 11/2004 | Kono | 277/355 |
| 2007/0102886 A1 * | 5/2007 | Uehara et al. | 277/355 |

FOREIGN PATENT DOCUMENTS

| | | |
|---|---|---|
| EP | 0933567 | 8/1999 |
| EP | 1013975 | 6/2000 |
| EP | 1302708 | 4/2003 |
| EP | 1365181 | 11/2003 |
| EP | 1489340 | 6/2004 |
| EP | 1479953 | 11/2004 |
| GB | 2021210 | 11/1979 |
| WO | WO03/072287 | 9/2003 |
| WO | WO2005/103534 | 11/2005 |
| WO | WO2005/103535 | 11/2005 |
| WO | WO2005/103536 | 11/2005 |

OTHER PUBLICATIONS

International Search Report for PCT Patent App. No. PCT/EP2005/051611 (Jul. 25, 2005).

International Preliminary Examination Report for PCT Patent App. No. PCT/EP2005/051611 (Mar. 14, 2006).

* cited by examiner

LEAF SEAL AND METHOD OF PRODUCING A LEAF SEAL

This application is a Continuation of, and claims priority under 35 U.S.C. §120 to, International application no. PCT/EP2005/051611, filed Apr. 13, 2005, and claims priority therethrough under 35 U.S.C. §119 to German application no. No 110 2004 020 378.4, filed Apr. 23, 2004, the entireties of which are incorporated by reference herein.

BACKGROUND OF THE INVENTION

1. Field of the Invention

The present invention relates to the field of sealing in rotating machines, and more particularly to a leaf seal.

2. Brief Description of the Related Art

A gas turbine includes a rotor, on which various stages with compressor blades and turbine blades are provided, and a stator housing. The rotor is mounted in bearings at each end of the rotor shaft.

The control of the gas flow inside the gas turbine is of paramount importance with regard to both the functionality and the effectiveness. Sealing techniques are used at various locations along the rotor shaft in order to reduce the axial gas flow along the shaft. This is especially important next to the bearings in order to prevent the oil which is used in the bearings from overheating due to the hot gases of the gas flow.

Two types of sealing techniques are traditionally used in this situation—usually alternatively, sometimes also in combination. These are labyrinth seals and brush seals.

Labyrinth seals have no metal-to-metal contact between the rotor and the stator; the sealing effect is therefore relatively small. However, they offer the advantage of low rotational friction and of a therefore virtually unlimited service life.

On the other hand, brush seals have higher friction losses on account of the friction between the bristle ends and the rotor shaft. This results in wear, which limits the service life of the seal. However, brush seals stem the axial gas flow more effectively, in particular in the case of higher axial pressure differences.

The use of these techniques for sealing in gas turbines has numerous restrictions. First, the axial pressure difference that they can withstand is still fairly low. In the case of the brush seals, this is due to the bristles, which have the same stiffness in the axial and circumferential directions: high pressures can cause the bristles to yield in the axial direction. The capability of the seals to allow a significant radial movement and to resist it is also low.

The design of a brush seal is often a compromise between the use of a supporting plate, which is intended to give sufficient axial support, and the non-restriction of the radial movement.

In order to avoid the disadvantages of the known brush seals, a leaf seal has been proposed in U.S. Pat. No. B1-6,343,792, this leaf seal performing the same function as either a labyrinth seal or a brush seal but having the advantages of both. Instead of the bristles, which are produced from wires of circular cross section, thin metal leaves are assembled in a certain arrangement (see, for example, FIG. 3 of U.S. Pat. No. B1-6,343,792 or FIG. 1 of the present application). The leaves, which are oriented with their surfaces essentially parallel to the axial direction, are much stiffer in the axial direction than in the circumferential direction. Thus the seal can withstand higher pressure differences without restricting their possibilities for allowing radial movements. The wide region on the rotor, which is swept by the tips of the leaves, provides the opportunity of producing a hydrodynamic force during operation, and this hydrodynamic force can separate the leaf tips from the shaft. In this way, a distance of a few microns can be produced and maintained, so that the wear, the friction heat and the friction losses can be reduced virtually to zero.

The basic design relates to a number of thin metal leaves which have a controlled air gap between them and are fastened at a predetermined angle to the radius. The air gap is a critical design parameter: it enables an air flow to occur in order thus to produce the hydrodynamic effect; however, it must not be so large as to allow an excessive axial air flow.

Two variants of leaf spring designs are possible: in the one variant, the leaves are blown downward, but in the other they are blown upward. In the variant having the leaves blown downward, there is a distance between the leaf tips and the shaft during the assembly and start-up, and this gap is reduced to very small values by the use of an air flow between the leaves. On the other hand, in the variant having the upward blowing, there is slight mutual influencing between the leaf tips and the shaft during the start-up, and a distance is produced when the shaft is accelerated. In both cases, the flow of the medium through the air gaps between the leaves is critical, as is the control of the seal's inside diameter, which is produced by the leaf tips.

The air flow through the leaves can be varied by using a front and a rear plate which leave a narrow gap free between the surfaces of the leaf stack and the plates (see abovementioned FIGS. 1 and 3). A careful design of these geometries makes it possible to control the upward or downward blowing effects. It may also be desirable to assist the downward blowing effect by an active pressure feed along the length of the leaves or inward from the front side or from the rear directions.

One of the other main advantages of the leaf seal concept is a greater tolerance of the radial movement than in labyrinth or brush seals. This requires a large distance there between the inside diameter of the front and rear end plates and the shaft.

Depending on the geometry selected for the seal and on the diameter of the shaft to be sealed, the number of leaves can be several thousand or many thousand. The accuracy with which said leaves can be produced, assembled and connected, in the course of which a reproducible air gap between each pair of leaves is ensured, is critical for the successful implementation of every possible seal design.

The joining method for fixing the leaves in their position could be a mechanical technique, such as clamping in place, welding, or brazing or any possible combination thereof. It is quite obviously important that a minimum disturbance of the leaves or of their relative positions occurs during the joining process.

Various joining methods have already been proposed in the abovementioned publication U.S. Pat. No. 1-6,343,792. In the exemplary embodiments pertaining to FIGS. 1 to 21 of that publication, the leaves, with their top transverse edge, are brazed in place in a housing. In the exemplary embodiments according to FIGS. 22 to 28, the leaves are fastened in curved segments by a known welding method, such as laser welding, electron beam welding (EBW) or TIG welding, the welding being effected in the radial direction from outside through the segment up to the top transverse edges of the leaves (see FIG. 25 and the description on page 20, lines 7-48). The distance between the leaves can be set in this case by positioning elements (FIGS. 22 to 24) embossed in the leaves, by separate spacers (FIG. 27A), or by integral spacers (FIG. 27B). With regard to the use of the electron beam welding, no further details are given in the publication.

Electron beam welding is a method which is available on an industrial basis for the development or production of devices assembled from components within a wide range of various alloys and geometries.

The nature of the heat input, focussed to a high degree, and the accuracy with which the method can be controlled make it especially suitable for the welding of leaves, with or without spacers, for leaf seals.

Electron beam welding involves the use of special equipment in order to generate the electron beam. This equipment includes a cathode in order to emit electrons, which are then accelerated down an evacuated column by means of high voltage and are focussed on the substrate as a narrow beam with accurately controlled energy and position.

The penetration depth of the beam changes with the beam energy and the density of the target material, but is normally within a range of a few 10 microns right up to a few millimeters. The material volume affected is quickly melted, and a fusion welded joint with the surrounding material is produced.

For the optimum use of electron beam welding, those surfaces of the parts (23a, b in FIG. 5 of the present application) to be connected to one another which are to be welded should be in close contact (joint 24), so that a weld 25 capable of bearing load is obtained. This is different from most welding methods (see FIG. 4 of the present application), in which an intermediate space 21 is normally required between the parts 20a, b to be connected as filling space for a filler material in order to produce a weld 22 capable of bearing load.

The lower values of the disturbance in the material which are to be encountered in electron beam welding and are inherent in the method make the method especially suitable for the welding of thin components such as leaves, which are especially susceptible to such disturbances.

One aspect of present invention proceeds from the application of electron beam welding in the production of leaf seals which are assembled from individual leaves, with or without separate spacers.

In this case, the leaves must be produced from a suitable material which can easily be welded by electron beam welding. The design of the leaves and the way in which they are put together must be carefully controlled in order to optimize the joining by means of electron beam welding.

In particular, other aspects of the present invention start from the fact that successful electron beam welding is based on close contact between the surfaces to be connected in order to minimize the disturbances occurring during the welding. This close contact is not ensured in the joining technique as disclosed in publication US-B1-6,343,792. The welding there is effected in the radial direction from outside through the curved segment-shaped holding element and includes the top transverse edges of the leaves, which, on account of their arrangement in a circle, are relatively far apart. For the above-mentioned reasons, such a configuration of the welding process involves considerable disadvantages for the application of electron beam welding.

SUMMARY OF THE INVENTION

One aspect of the present invention therefore provides a welded leaf seal which can avoid the disadvantages of known leaf seals and can be distinguished in particular by markedly reduced disturbances in the region of the welded connections, and also includes methods of producing such a leaf seal.

Another aspect of the present invention includes designing the leaves in such a way and arranging them in the leaf seal in such a way that they abut against one another at the side edges directly or via intermediate spacers along at least one contact line extending over a plurality of leaves, and designing the welded connections as welds directed along the at least one contact line. Owing to the fact that the electron beam welding is carried out along the contact lines at which the elements to be connected abut against one another directly, especially high-grade welded connections which are able to cope, in particular with the loads occurring in a gas turbine, are obtained.

Spacers are preferably provided in order to set the distance between the leaves, the at least one contact line running in the region of the spacers, and the spacers being arranged in the outer end region of the leaves. The spacers may either be formed on the leaves as regions of greater thickness, the spacers either having a constant thickness or being designed with a thickness decreasing inward.

However, the spacers may also be designed as elements embossed in the leaves. In this case, the leaves can be produced by a simple stamping and embossing process and can then easily be oriented to one another and connected (welded) to one another.

Each leaf, in the radial direction, preferably has at least two embossed spacers which are arranged one behind the other and fix the position of the leaves, namely distance and inclination, relative to one another.

The leaves can be held in their entirety with the outer end in a housing and can be welded to the housing, the leaves being connected to one another and to the housing via laterally arranged welds which run in the axial direction and extend through the housing up to the leaves.

However, the leaves can also be welded on the outside to an encircling backing ring on the outside, preferably a segmented backing ring, which is then held in a housing.

A preferred configuration of the method according to the invention is characterized by the fact that the leaves are held in a housing and are welded through the housing to one another and to the housing.

Spacers integrated in the leaves are preferably used for arranging the leaves, these spacers being embossed in the leaves by an embossing process or an etching process (PCM—Photo-Chemical Machining). After the leaves provided with the spacers have been produced, the leaves are put into a clamping device in which they are firmly oriented in their positions characteristic of the subsequent leaf seal.

BRIEF DESCRIPTION OF THE DRAWINGS

The invention is to be explained in more detail below with reference to exemplary embodiments in connection with the drawing, in which.

DETAILED DESCRIPTION OF EXEMPLARY EMBODIMENTS

Figure 1:
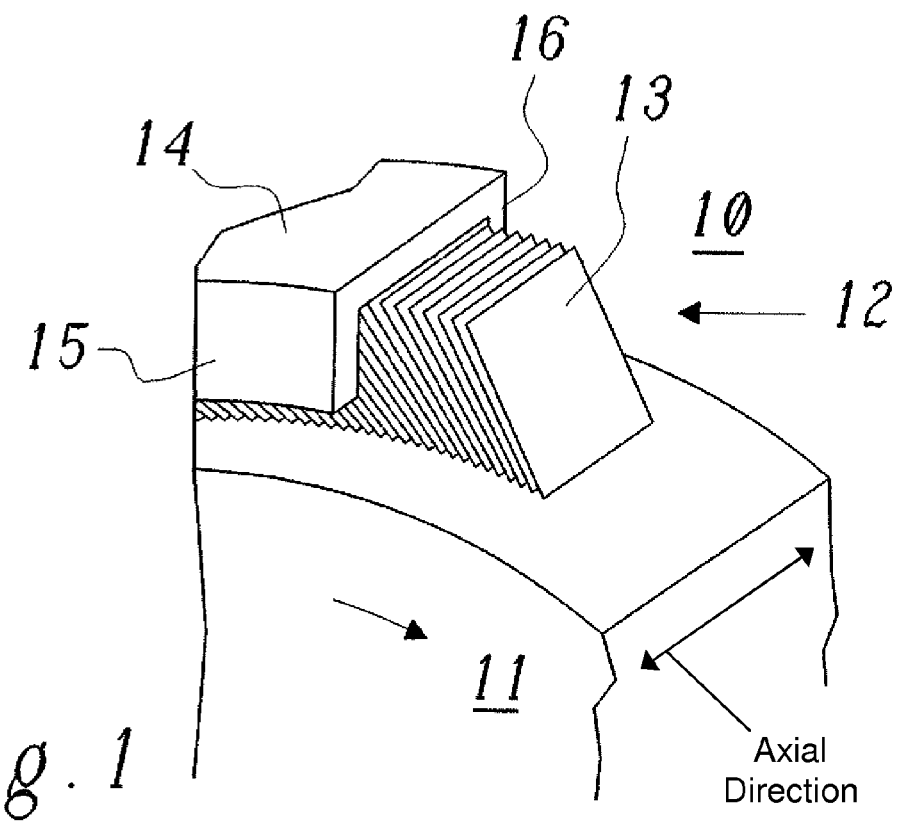
FIG. 1 shows a perspective side view of the typical construction of a leaf seal as used in a gas turbine.
Figure 2:
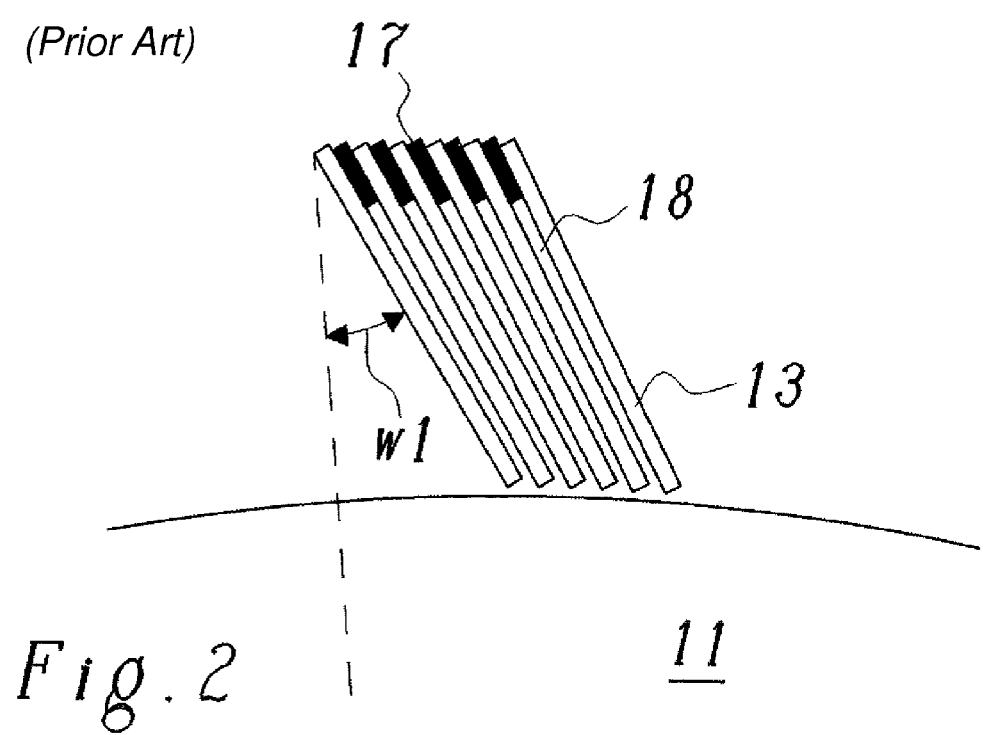
FIG. 2 shows, in the axial direction, the side view of the arrangement, inclined from the radial direction, of individual leaves with their intermediate spacers.
Figure 6:
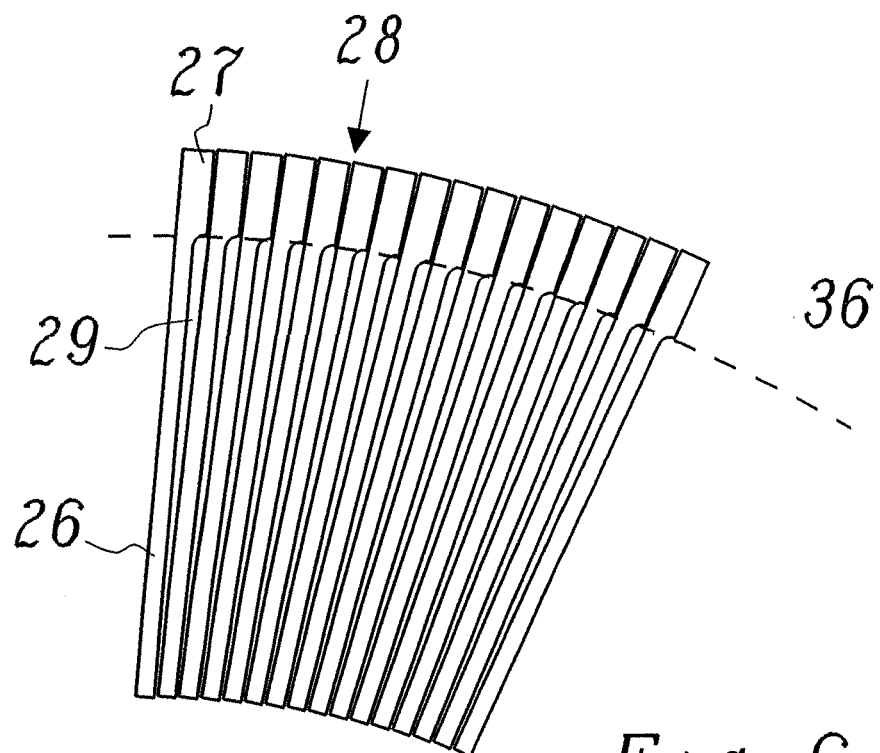
FIG. 6 shows, as viewed in the axial direction, a stack of leaves with integral spacers of constant thickness, which, on account of the angular offset at the transition between spacer and leaf body, form a continuous, circular contact line, along which they are welded to one another according to the invention.
Figure 7:
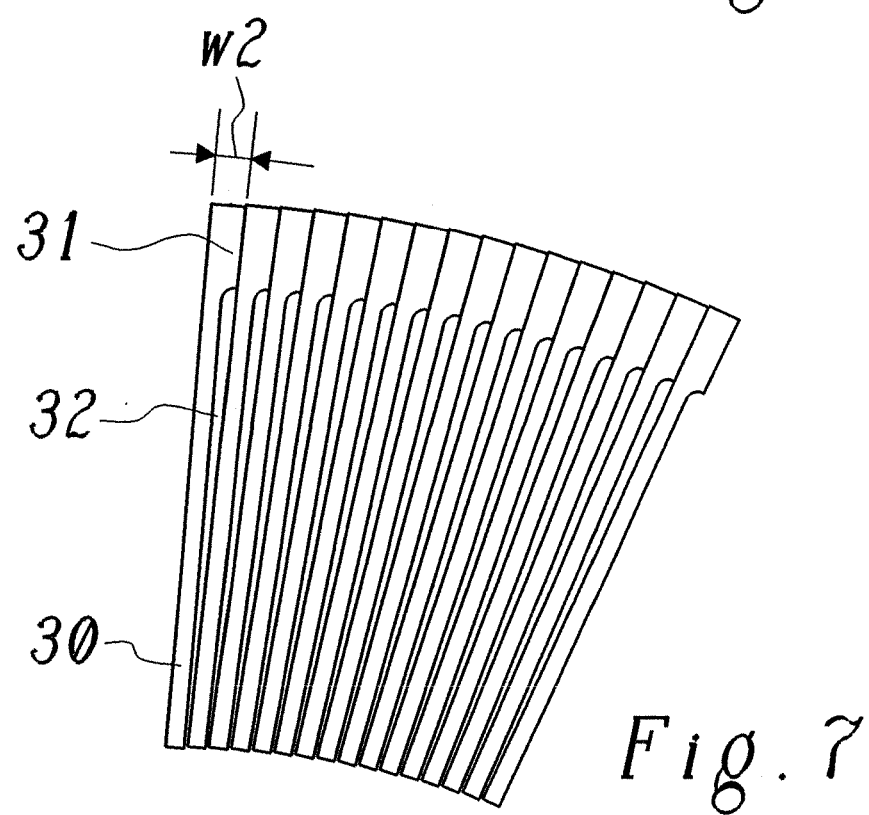
FIG. 7 shows, in a representation comparable with FIG. 6, a stack of leaves with integral, slightly wedge-shaped spacers which, if the wedge angle is equal to the angular offset between adjacent leaves, touch one another over the entire surface of the spacers.
Figure 8:
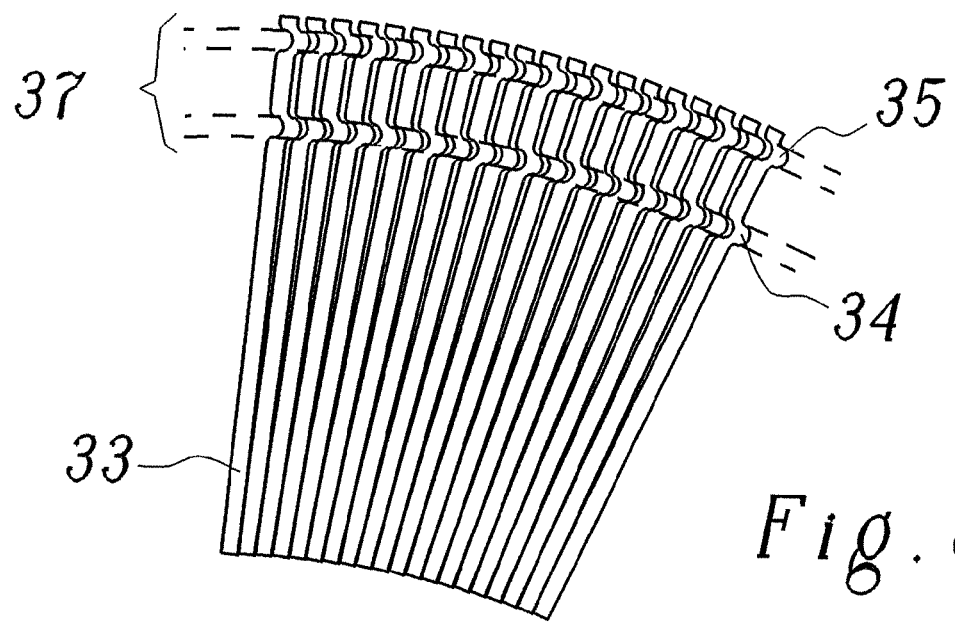
FIG. 8 shows, in a representation comparable with FIG. 6, a stack of leaves with integral, embossed pairs of spacers which automatically set and fix the correct distance and angular offset between adjacent leaves and form a multiplicity of concentric contact lines suitable for the welding.

Shown in FIG. 1 in a perspective side view is the typical construction of a leaf seal as used in a gas turbine. The leaf seal 12 seals a rotor shaft 11, rotating in the arrow direction, of the gas turbine 10 with respect to a housing 14. A stack of tightly spaced-apart thin leaves 13 is arranged in a ring in the circular ring-shaped intermediate space between the rotor shaft 11 and the housing 14. With their surface, the leaves 13 are oriented parallel to the axis of rotation of the machine. According to FIG. 2, the leaves are tilted from the radial direction by an angle w1 and have a narrow gap or intermediate space 18 between them, which is preferably established by spacers 17 arranged between the leaves 13. The spacers 17 of FIG. 2 are shown as separate elements. However, they may also be integrated in the leaves as shown in FIGS. 6-8.

Figure 3:
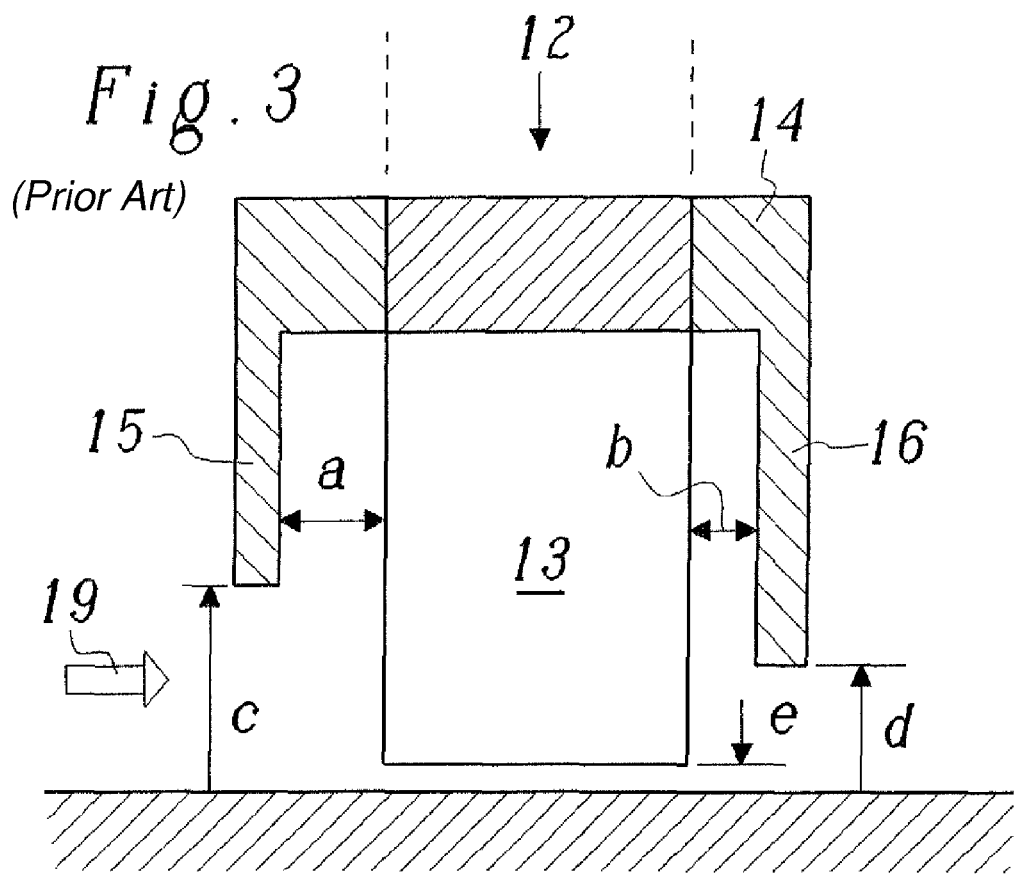
FIG. 3 shows the view of a leaf seal, comparable with FIG. 1, in the circumferential direction, with a front and a rear end plate.

According to FIGS. 1 and 3, the air flow through the leaves 13 can be varied by using a front and a rear end plate 15 and 16, respectively, which leave a narrow gap free between the surfaces of the leaf stack and the end plates 15, 16 (distances a and b in FIG. 3). A careful design of these geometries makes it possible to control the upward or downward blowing effects mentioned at the beginning. It may also be desirable to assist the downward blowing effect by an active pressure feed along the length of the leaves or inward from the front side or from the rear directions.

One of the other main advantages of the leaf seal concept shown in FIG. 1 or 3 is a greater tolerance of the radial movement than in labyrinth or brush seals. This requires a large distance between the inside diameter of the front and rear end plates 15, 16 and the rotor shaft 11 (distances c and d in FIG. 3). The gap between the leaves 13 and the rotor shaft (distance e in FIG. 3) is only a few microns.

Figures 4, 5:
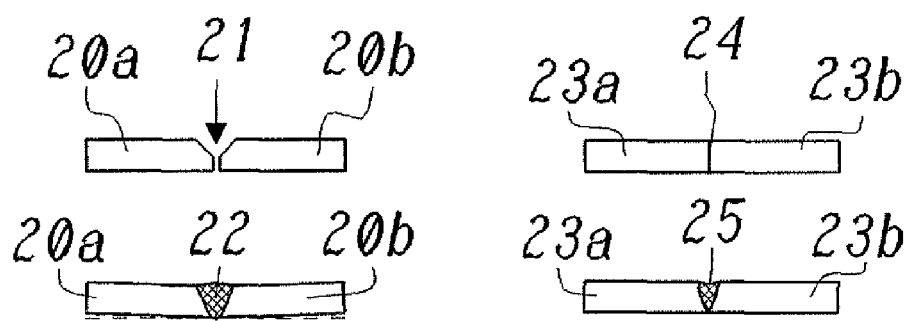
FIG. 4 shows the configuration of the welding location in the case of conventional welding with filler material.
FIG. 5 shows the configuration, comparable with FIG. 4, of the welding location in the case of electron beam welding, during which the parts to be welded abut against one another with a close joint.

The successful electron beam welding is based on close contact between the surfaces of the parts 23a, b to be joined (FIG. 5) in order to minimize the disturbances which occur. These requirements must be fulfilled as effectively as possible in the assembled leaves.

If the leaves of a stack are joined together directly in their final, circular positions, careful attention must then be paid to the angular offset of each leaf relative to its neighbor. This is shown in FIG. 6 with reference to a first preferred exemplary embodiment of the invention. Here, the leaves 26 have integral spacers 27 in the form of widened end regions of constant thickness. If the individual leaves 26 of the stack are put together with the requisite angular offset, gaps or intermediate spaces 29 are obtained between the leaves 26, and wedge-shaped gaps 28 are obtained at the outer margin or top margin of the stack, so that the outer margin does not have the close contact between adjacent leaves which is required for optimum electron beam welding. On the contrary, the contact between the adjacent leaves takes place at the transition between the spacers 27 and the leaf body and forms the contact line 36, depicted as a broken line.

The contact line 36 shown of the point-to-point contact between the leaves 26 is the preferred line for the electron beam welding. In comparison, electron beam welding which is applied at the outer margin of the leaf stack, where the gaps 28 between the leaves 26 are shown, tends more toward shrinkage disturbance. It is also more difficult to control the penetration depth of the welding, since the electron beam can penetrate into the gap 28 between the leaves 26 without resistance.

Several possible alternatives for reducing this problem are shown in FIGS. 7 and 8. In FIG. 7, the leaves 30, likewise at their outer ends, have integral spacers 31 in the form of widened regions in order to create the requisite gaps or intermediate spaces 32 between the leaves 30. In this exemplary embodiment, the angular offset between adjacent leaves is achieved and established by the integral spacers 31 being of wedge-shaped design with a wedge angle w2 in such a way that their thickness decreases uniformly inward. The result of this is that the leaves 30 are in contact over the entire surface of the integral spacers 31, i.e., the contact line is widened to form a contact band.

In FIG. 8, the leaves 33 also have integral spacers 34, 35 at their outer ends, these spacers 34, 35 being in the form of embossed horizontal beads which are arranged one behind the other in the radial direction and are at a distance from one another. Given suitable shaping of the spacers 34, 35, both the correct angular offset and the correct distance apart is obtained automatically between adjacent leaves, so that the embossed leaves 33 can be assembled in a simple manner to form stacks and can then be immediately welded. In the case of the spacers 34, 35 shown in FIG. 8, four contact lines 37, depicted as broken lines, are obtained, along which the electron beam welding can be carried out.

The configurations shown in FIGS. 6-8 relate to leaves having integral spacers. However, similar concepts can be applied just as easily to leaves having separate spacers.

The use shown in particular in FIG. 8 of spacers designed in this way has a number of advantages. Firstly, the angular offset can be set exactly from leaf to leaf, as a result of which the need for the leaves to be put together exactly is reduced. Secondly, as clearly shown in FIG. 8, there are numerous lines on which the electron beam welding can be focussed in order to produce acceptable welding with little disturbance.

As already mentioned, the leaves according to FIG. 8 can be formed by a method such as embossing, for example. The embossing permits the production of features which emerge from the surface, this having more than one advantage: with a suitable design and a suitable development, embossed features such as those shown above can help to accurately position the leaves relative to one another; furthermore, they can produce the requisite angular offset from one leaf to the next; and they can provide contact points in order to increase the effectiveness of the electron beam welding.

Figure 9:
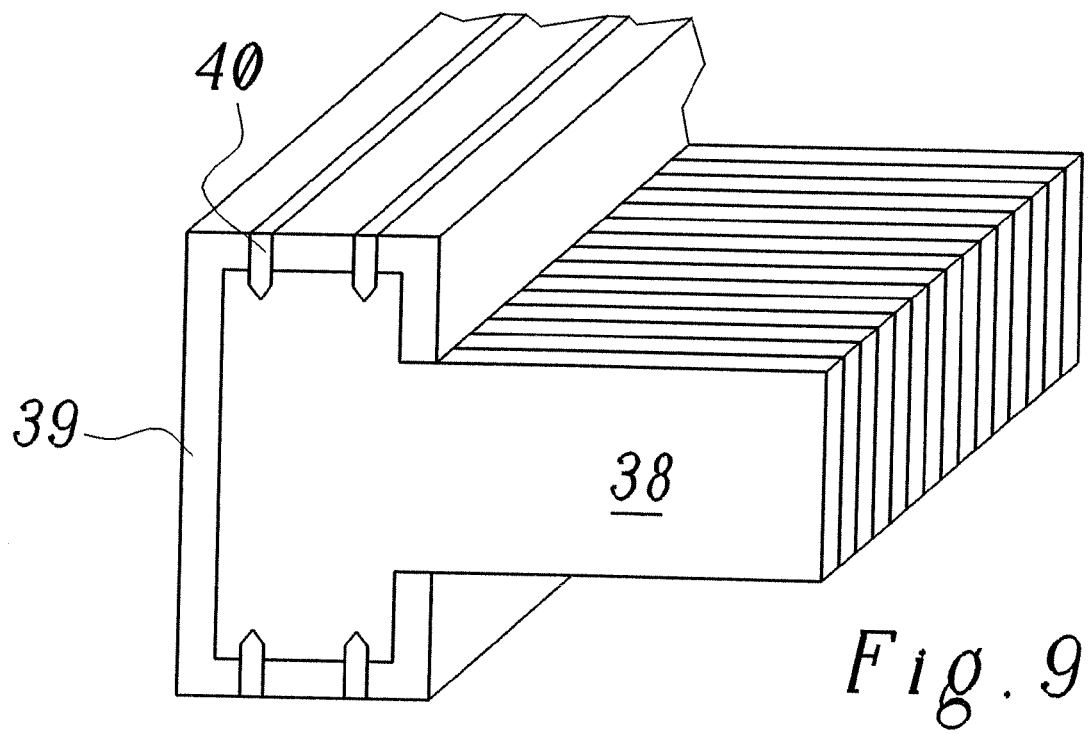
FIG. 9 shows a section of a leaf seal according to an exemplary embodiment of the invention, in which section the welding of the leaves is executed from the sides through a housing accommodating the leaves.

Another possibility shown in FIG. 9 of the electron beam welding consists in the fact that a housing 39 can be welded directly around the outside of the locally fixed ends of the leaves 38. The T-shaped leaves 38 can be put together and positioned in the housing, and then the electron beam welding penetrates laterally at the predetermined lines through the housing 39 and welds the leaves 38 together in a single step by corresponding welds 40.

If—as shown in FIG. 8—an embossing step is to be used during the production of the leaves, to be precise either independently or in combination with a sheet-forming method, it is possible to allow the leaves to fall directly from the embossing tool into a suitably designed clamping device. This clamping device (not shown in the figures) then orients and positions the leaves relative to one another. This can be with the desired final bending or in a straight section. Such a straight section can be welded in a linear position, and the desired lengths can then be bent to the final curvature, to be precise before the final welding at a backing ring or another structural member.

Figure 10:
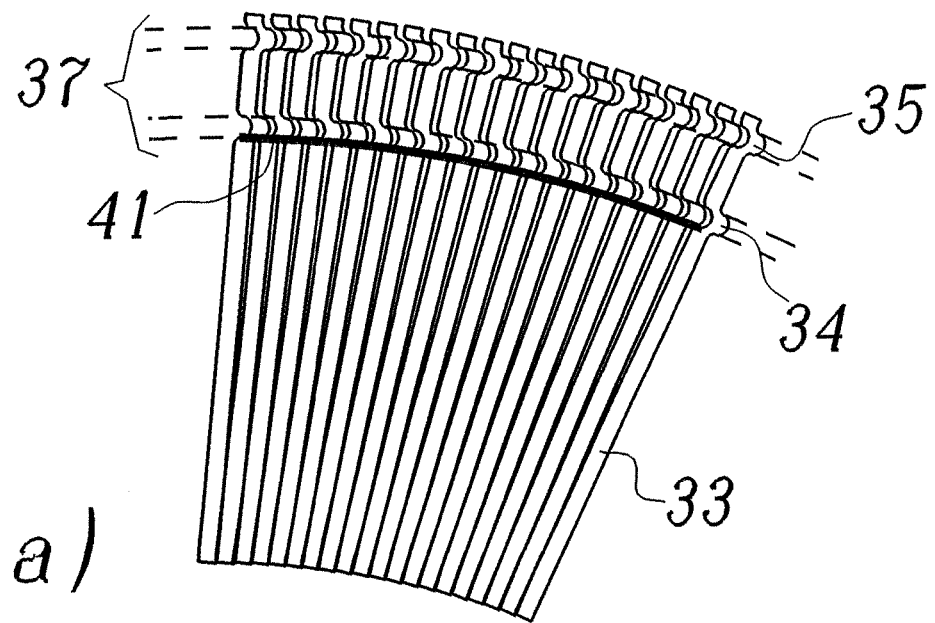
FIG. 10 shows two steps during the welding of a leaf stack with embossed spacers having a backing ring, the leaves first of all being positioned relative to one another by means of the spacers (FIG. 10a) and then the welds being placed for connecting the leaves to one another and to the backing ring.
Figure 10:
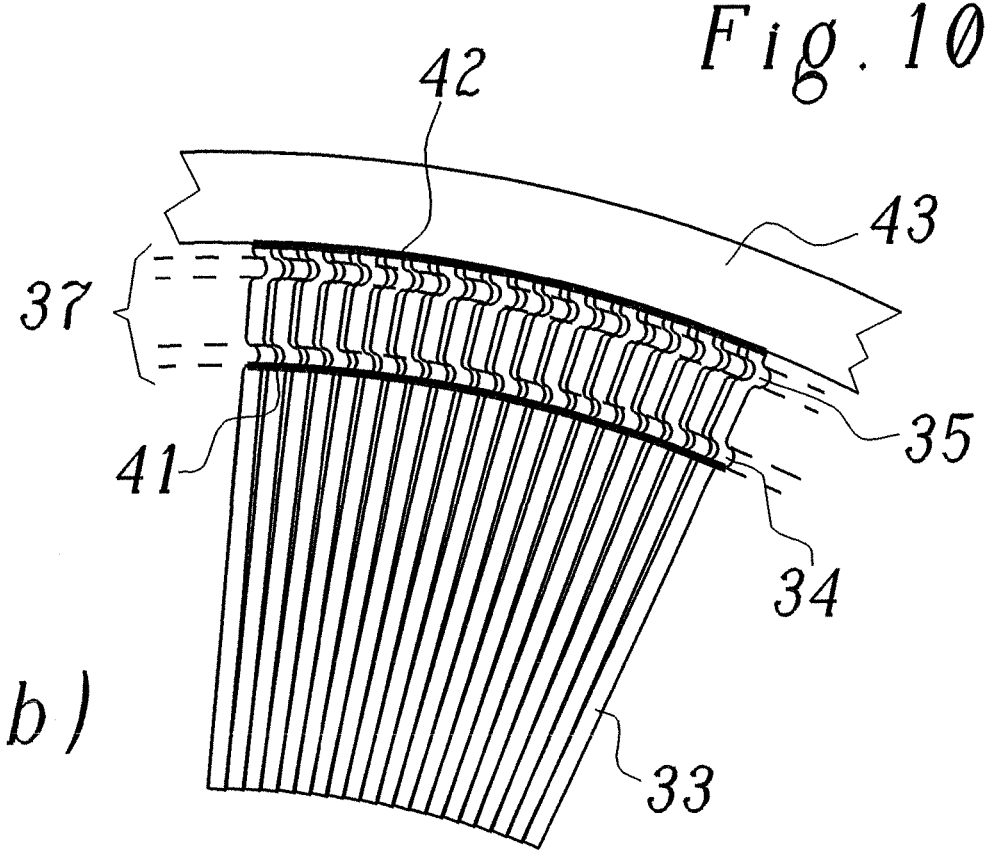

Such a process is shown in FIG. 10 in two steps (FIG. 10a and FIG. 10b). The leaves 33 provided according to FIG. 8 with embossed integral spacers 34, 35 are put together according to FIG. 10a to form a stack, the correct distance apart and angular offset being set by the spacers 34, 35. Along one of the contact lines 37, the leaves are then connected with a first weld 41 by electron beam welding. The stack with the leaves 33 welded to one another is then put into a backing ring 43 which can be a whole ring or a segmented ring with, for example, two halves and firmly connected according to FIG. 10b to the backing ring 43 by means of a second weld 42. The backing ring 43 provided with the leaves 33 can then be inserted into a recess, provided for this purpose, in the housing.

LIST OF DESIGNATIONS

10 Gas turbine
11 Rotor shaft
12 Leaf seal
13 Leaf
14 Housing
15, 16 End plate
17 Spacer (separate)
18 Gap (intermediate space)
19 Gas flow
20a, b Part
21 Intermediate space (filling space)
22, 25 Weld
23a, b Part
24 Joint
26, 30, 33 Leaf
27, 31 Spacer (integral)
28 Gap (wedge-shaped)
29, 32 Gap (intermediate space)
34, 35 Spacer (embossed)
36, 37 Contact line
38 Leaf
39 Housing
40 Weld
41, 42 Weld
43 Backing ring
a, . . . ,e Distance
w1, w2 Angle While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A leaf seal for sealing a shaft rotating about an axis, the leaf seal comprising:
a multiplicity of spaced-apart leaves arranged in a concentric circle around the axis with an angular offset between the individual leaves, and fixed in their position by electron beam welded connections, the leaves having first side edges running parallel to said axis, second side edges running perpendicular to said axis, and surfaces, the leaves being oriented essentially parallel to the axis, wherein the leaves are configured and arranged in the leaf seal so that they directly abut against one another at said second side edges with a point-to-point contact between each pair of neighboring leaves, said point-to-point contact lying on a contact line which is concentric to said axis and extends along said second side edges over a plurality of leaves, and wherein the welded connections comprise a welding seam running along and restricted to said contact line.

2. The leaf seal as claimed in claim 1, further comprising:
spacers configured and arranged to set the distance between the leaves; and
wherein the contact line runs in the region of the spacers.

3. The leaf seal as claimed in claim 2, wherein the spacers are arranged in an outer end region of the leaves.

4. The leaf seal as claimed in claim 2, wherein the spacers are formed on the leaves as regions of greater thickness.

5. The leaf seal as claimed in claim 4, wherein the spacers have a constant thickness.

6. The leaf seal as claimed in claim 1, wherein the angular offset creates first wedge-shaped gaps between adjacent leaves extending radially outward from the contact line and second wedge-shaped gaps between adjacent leaves extending radially inward from the contact line.

* * * * *